US011498443B1

(12) United States Patent
Akella et al.

(10) Patent No.: US 11,498,443 B1
(45) Date of Patent: Nov. 15, 2022

(54) ELECTRIC VEHICLE WITH PRECHARGE MODE

(71) Applicant: Motiv Power Systems, Inc., Foster City, CA (US)

(72) Inventors: Sowmya Akella, Bengaluru (IN); James Michael Castelaz, Alameda, CA (US); Venkatesh Prasad Hanglur Narasimha, San Mateo, CA (US); Joshua Sealand, San Mateo, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 0 days.

(21) Appl. No.: 17/120,257

(22) Filed: Dec. 13, 2020

Related U.S. Application Data

(60) Provisional application No. 62/948,135, filed on Dec. 13, 2019.

(51) Int. Cl.
*B60L 53/62* (2019.01)
*H02J 7/00* (2006.01)
(Continued)

(52) U.S. Cl.
CPC .............. *B60L 53/62* (2019.02); *B60L 3/0046* (2013.01); *B60L 53/20* (2019.02); *B60L 53/22* (2019.02);
(Continued)

(58) Field of Classification Search
CPC ..... Y02T 10/70; Y02T 10/7072; Y02T 90/14; Y02T 90/12; B60L 2270/20;
(Continued)

(56) References Cited

U.S. PATENT DOCUMENTS

2010/0276993 A1* 11/2010 King .................. B60L 50/15
307/9.1
2015/0239405 A1* 8/2015 Kaihara .................. B60L 53/18
219/202

(Continued)

OTHER PUBLICATIONS

Monteiro, Vitor, et al. "Comprehensive comparison of a current-source and a voltage-source converter for three-phase EV fast battery chargers." 2015 9th International Conference on Compatibility and Power Electronics (CPE). IEEE, 2015. (Year: 2015).*

*Primary Examiner* — Ryan Johnson
(74) *Attorney, Agent, or Firm* — Adibi IP Group, PC; Amir V. Adibi; Andrew C. Palmer

(57) ABSTRACT

A system comprises an EVSE and an electric vehicle having a precharge mode. To charge a battery, the vehicle is connected to the EVSE. In some cases, the battery is unable to energize power buses. For example, if the battery is too cold and has insufficient charge, then the battery will not energize the power buses. If the battery cannot energize the power buses, then a precharge mode is enabled. During the precharge mode, charge is pumped onto two power buses until a setpoint voltage is reached. For example, a precharge circuit pumps charge onto one power bus and a power converter pumps charge from that bus onto a second bus. Once the setpoint voltage is reached, a current source charger is enabled, and energy stored on both buses is used to facilitate the turn-on of the charger, the precharge mode is disabled, and the EVSE charges the battery.

20 Claims, 8 Drawing Sheets

ELECTRIC VEHICLE PLUGGED INTO EVSE

(51) Int. Cl.
*B60L 53/20* (2019.01)
*B60L 58/10* (2019.01)
*B60L 3/00* (2019.01)
*B60L 53/22* (2019.01)

(52) U.S. Cl.
CPC ............. *B60L 58/10* (2019.02); *H02J 7/007* (2013.01); *H02J 7/0047* (2013.01); *B60L 2210/10* (2013.01); *B60L 2240/547* (2013.01); *B60L 2270/20* (2013.01); *H02J 2207/20* (2020.01); *Y02T 10/7072* (2013.01); *Y02T 90/10* (2013.01); *Y02T 90/12* (2013.01)

(58) Field of Classification Search
CPC ...... B60L 3/0092; B60L 58/12; B60L 3/0046; B60L 53/22; H02J 2310/48; H02J 2207/20

See application file for complete search history.

(56) References Cited

U.S. PATENT DOCUMENTS

| | | | | |
|---|---|---|---|---|
| 2018/0312074 A1* | 11/2018 | Tsutsumi | ............... | H01M 10/48 |
| 2019/0135119 A1* | 5/2019 | Nozawa | ................ | H02M 3/158 |
| 2020/0269710 A1* | 8/2020 | Fong | ....................... | B60L 50/61 |

\* cited by examiner

ELECTRIC VEHICLE PLUGGED INTO EVSE

CIRCUIT DIAGRAM OF CONTROLLER

ELECTRIC VEHICLE PLUGGED INTO EVSE AND BATTERY PACK IS ABLE TO ENERGIZE HVDC BUSES

ELECTRIC VEHICLE WITH PRECHARGE MODE

CROSS REFERENCE TO RELATED APPLICATIONS

This application claims the benefit under 35 U.S.C. § 119 from U.S. Provisional Patent Application Ser. No. 62/948,135, entitled "Electric Vehicle With Precharge Mode," filed on Dec. 13, 2019, the subject matter of which is incorporated herein by reference.

TECHNICAL FIELD

The described embodiments relate to electric vehicle charging, and more particularly, to techniques for charging electric vehicle batteries through electric vehicle charging stations.

BACKGROUND INFORMATION

An electric vehicle typically includes energy storage systems that store electrical energy, such as battery packs. Power circuitry within the electric vehicle uses energy stored in the battery packs to drive an electric motor of the electric vehicle. After the energy stored in the battery packs has been depleted, the battery packs must be charged. An electric vehicle charge station couples the power circuitry of the electric vehicle to an Alternating Current (AC) power source to charge the battery packs. However, such power circuitry may require a voltage source to be connected to its output before it can transfer power from the AC power source to its output and the battery packs. In some situations, the battery packs on the vehicle may not be able to be used as such a voltage source, and an alternative voltage source is needed before the power circuitry can transfer power to charge the battery packs.

SUMMARY

A system comprises an electric vehicle charging station (EVSE) and an electric vehicle. The electric vehicle has a precharge mode. The electric vehicle has at least one battery that will eventually require charging. To charge the battery, the electric vehicle is connected to the EVSE. In some cases, after connecting to the EVSE, the battery will be unable to energize power buses of the electric vehicle or accept charge. For example, if the battery is too cold, too hot, too imbalanced or has an internal fault, such as a blown fuse or isolation failure, then the battery will not energize the power buses or accept charge. If the battery will not energize the power buses or accept charge, then a precharge mode may be enabled. During the precharge mode, charge is pumped onto a power bus until a setpoint voltage is reached. For example, a precharge circuit pumps charge onto the power bus from a 12V voltage source on the vehicle. Once the setpoint voltage is reached, then a current source charger is enabled, the precharge mode is disabled, and the battery is brought to a condition such that the battery is able to accept charge. If a battery cannot be brought to a condition where it can accept charge, the vehicle can still use power from the current source charger output to run ancillary features on the vehicle, such as air conditioning, heat, or hydraulics. For example, if the battery is too cold, then the battery pack is heated. Once chargeable (e.g., ready to accept charge), the battery is charged using the EVSE.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some exemplary embodiments of the invention, examples of which are illustrated in the accompanying drawings.

Figure 1:
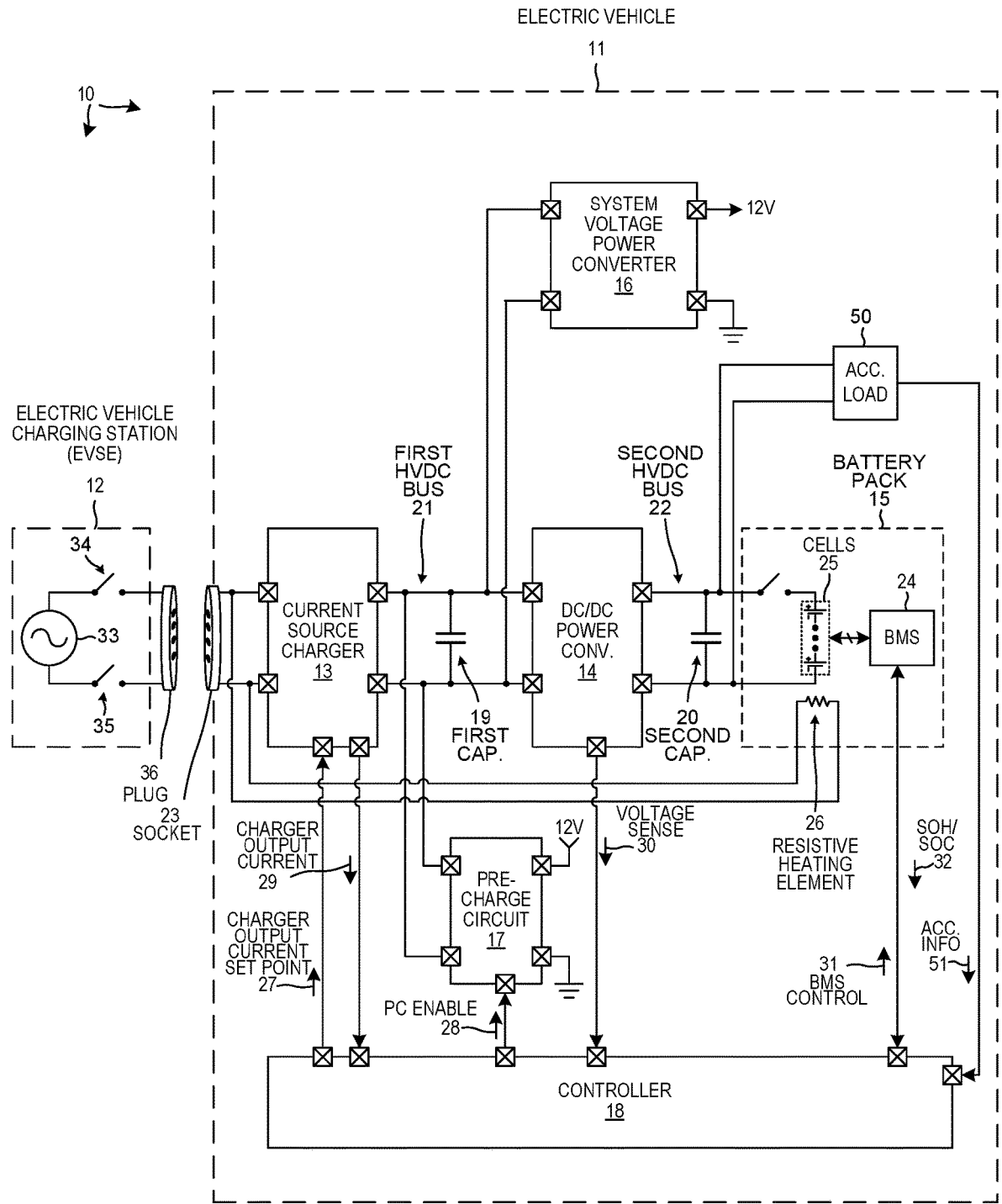
FIG. 1 shows one embodiment of a system 10 having a precharge mode.

FIG. 1 shows one embodiment of a system 10 having a precharge mode. System 10 includes an electric vehicle 11 having a precharge mode and an electric vehicle charging station (EVSE) 12. The electric vehicle 11 connects to the EVSE 12 for charging. The electric vehicle 11 comprises a current source charger 13, a DC-to-DC power converter 14, a battery pack 15, a system voltage power converter 16, a precharge circuit 17, a controller 18, a first capacitor 19, a second capacitor 20, a first high voltage DC (HVDC) bus 21, a second HVDC bus 22, and a socket 23. The battery pack 15 comprises a battery management system (BMS) 24, energy storage cells 25, and a resistive heating element 26.

In an embodiment, the BMS 24 includes detection circuitry that can detect various conditions in which the battery may not accept charge. For example, the detection circuitry may detect that the battery is too cold, too hot, the battery's cells are too far out of balance with each other, the battery has an internal fault, such as a blown fuse, welded contactor, leak, disconnected connector, improper ground or failure of isolation.

The EVSE 12 comprises an AC power source 33, switches 34 and 35, and plug 36. In the example of FIG. 1, the socket 23 of the electric vehicle 11 is not connected to the plug 36 of the EVSE 12. Charging of the electric vehicle 11 with EVSE 12 is discussed in connection with FIG. 2.

The first HVDC bus 21 is coupled between the current source charger 13 and the DC-to-DC power converter 14. The precharge circuit 17 and system voltage power converter 16 are coupled to the first HVDC bus 21. The first capacitor 19 is coupled between lines of the first HVDC bus 21. The first capacitor 19 is also referred to as the "first high voltage DC bus capacitor."

The second HVDC bus 22 is coupled between the DC-to-DC power converter 14 and the second capacitor 20. The second capacitor 20 is also referred to as the "second HVDC bus capacitor." The battery pack 15 is coupled between the lines of the second HVDC bus 22. Alternatively, the battery pack may be coupled across the first HVDC bus 21.

Whenever it is powered on and the voltage across both HVDC buses 21 and 22 is below each buses' maximum voltage, the DC-to-DC power converter 14 will convert power between the HVDC buses 21 and 22 in a direction and magnitude so as to attempt to drive the voltage of the first HVDC bus 21 to a first HVDC bus nominal voltage setpoint. The first HVDC bus nominal voltage setpoint is a lower voltage than a precharge voltage setpoint.

The controller 18 generates and supplies a charger output current setpoint ("COCS") signal 27 to the current source charger 13. The COCS signal 27 provides a set point for the output current of the current source charger 13. A charger output current signal 29 is provided from the charger 13 to the controller 18 that indicates the output of current output from the charger 13. After the electric vehicle 11 is connected to the EVSE 12 and after the first HVDC bus 21 has adequate voltage on it, the controller 18 controls the current source charger 13 to convert the AC supply voltage output by the EVSE 12 into direct current on the first HVDC bus, which may be used to charge the battery pack 15 and/or power other vehicle loads, including battery heating or cooling, accessory loads 50, and/or the system voltage power converter 16.

The controller 18 generates and supplies a precharge circuit enable signal 28 to the precharge circuit 17. The precharge circuit enable signal 28 enables and disables the precharge circuit 17. In a precharge mode, the controller 18 controls the precharge circuit 17 to pump charge onto the first HVDC bus 21. In another embodiment, the precharge circuit 17 is coupled to the second HVDC bus 22 and charge is pumped onto the second HVDC bus.

The controller 18 receives a voltage sense signal 30 from the DC-to-DC power converter 14. Depending on operation of the controller 18, the voltage sense signal 30 indicates that a setpoint voltage is present on the first HVDC bus 21 or on the second HVDC bus 22.

The controller 18 generates and supplies a BMS control signal 31 to the BMS 24 of the battery pack 15. The BMS control signal 31 controls operation of the battery pack 15, including opening and closing of the battery contactor(s), operating the resistive heating element 26, and obtaining battery information. The controller 18 receives State of Health (SoH) or State of Charge (SoC) information 32 from the BMS 24.

Figure 2:
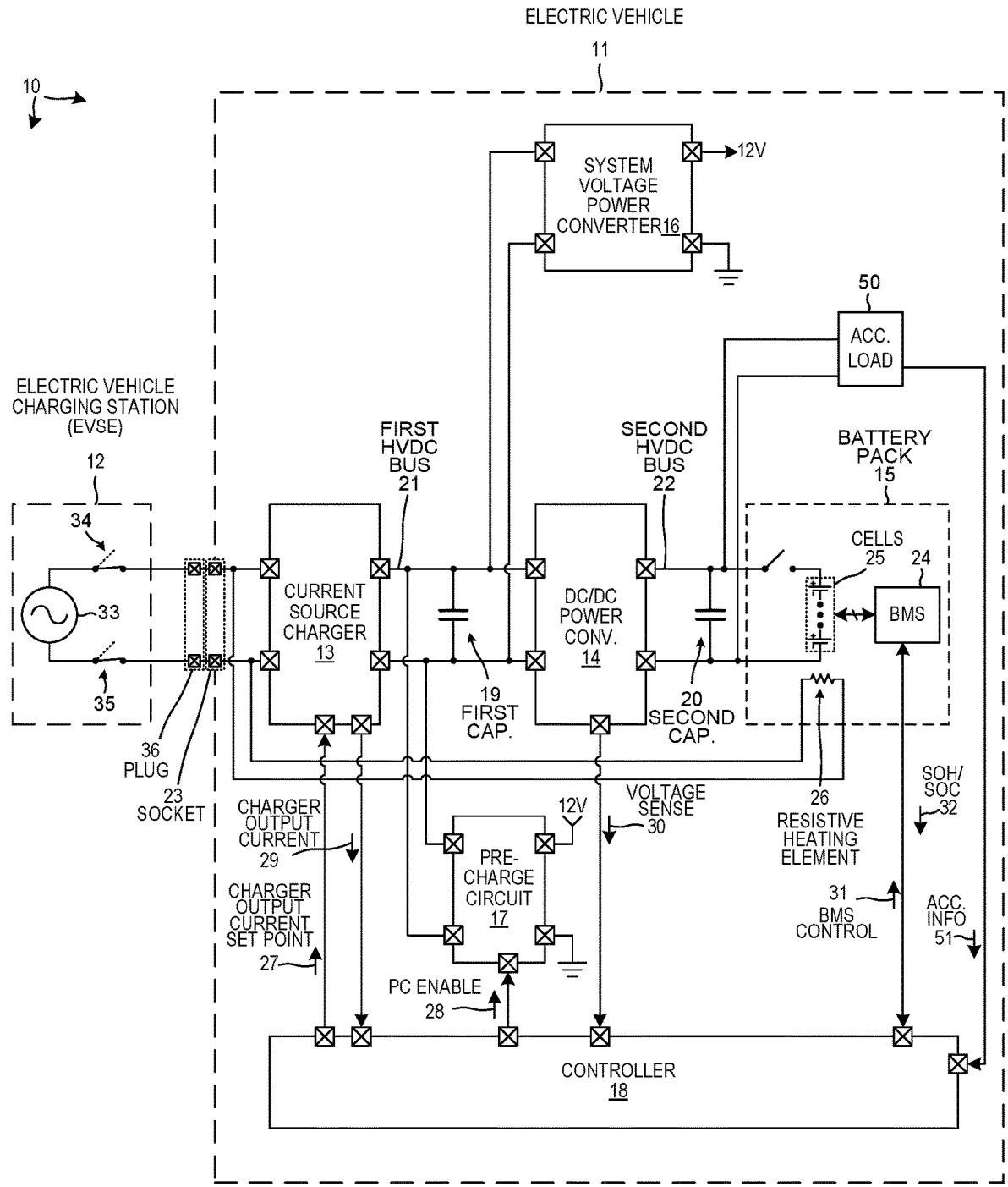
FIG. 2 is a diagram showing an electric vehicle 11 connected to an EVSE 12.

FIG. 2 is a diagram showing the electric vehicle 11 connected to the EVSE 12. The plug 36 of the EVSE 12 is connected to the socket 23 of the electric vehicle 11. The controller 18 detects that the electric vehicle 11 is plugged into the EVSE 12. In response, the controller 18 controls the current source charger 13 via the COCS signal 27 to signal to the EVSE 12 that charging can be initiated. The EVSE 12 enables switches 34 and 35 thereby connecting the current source charger 13 to the AC source 33. Operation after the electric vehicle 11 is connected to the EVSE 12 is explained below in connection with FIG. 4.

Figure 3:
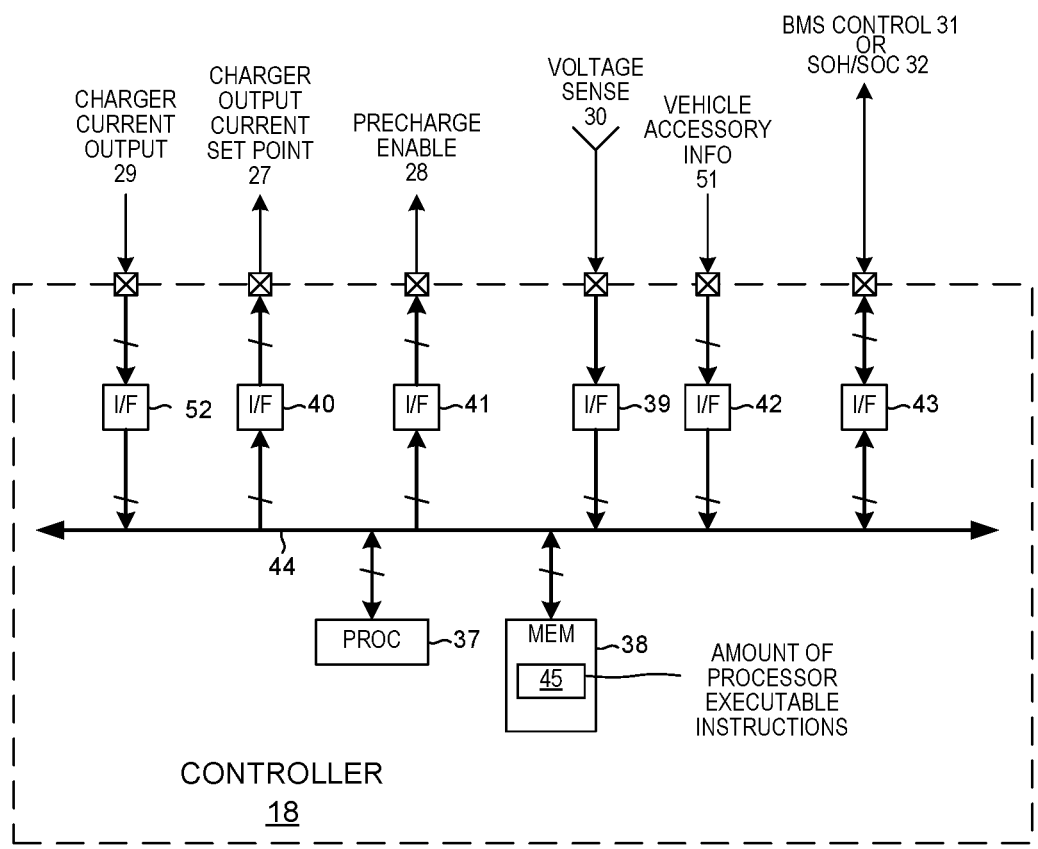
FIG. 3 is a circuit diagram of a controller 18.

FIG. 3 is a circuit diagram of controller 18. The controller 18 comprises a processor 37, a memory 38, interface circuits 39, 40, 41, 42, 43, and 52, and communication bus 44. The memory 39 stores an amount of processor executable instructions 45. In operation, the processor 37 reads the instructions 45 from memory 38 across the communication bus 44. The processor 37 executes the instructions 45 thereby causing the processor 37 to detect if the battery pack 15 of the electric vehicle 11 is able or unable to energize the second HVDC bus 22 of the electric vehicle 11. If the processor 37 determines that the battery pack 15 is unable to energize the second HVDC bus 22, then the processor 37 enables a precharge mode. The processor 37 disables the precharge mode in response to detecting that the current source charger 13 is outputting positive current on to the first HVDC bus 21 as reported by the charger output current signal 29.

Figure 4:
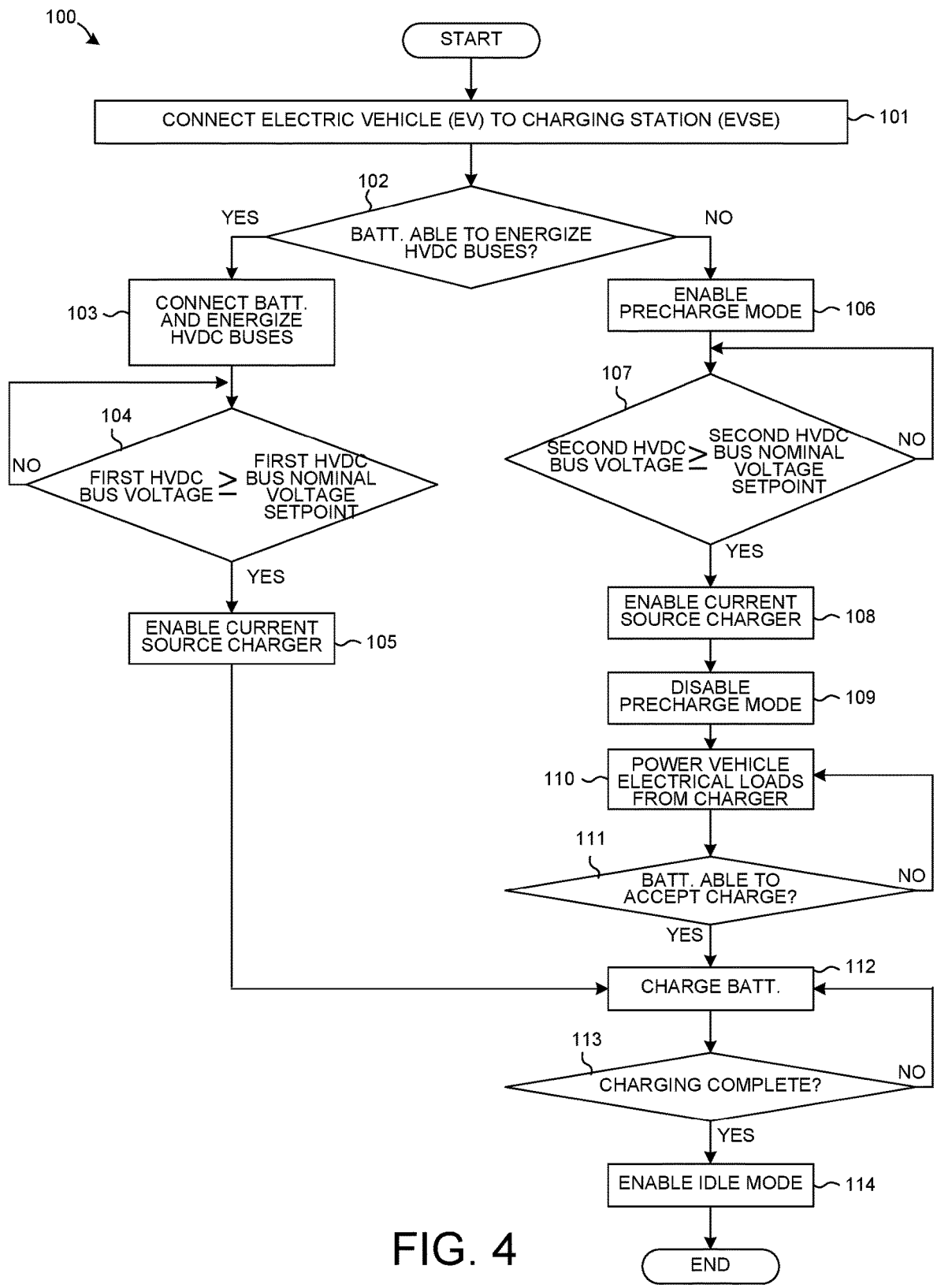
FIG. 4 is a flowchart of a method 100 in accordance with one novel aspect.

FIG. 4 is a flowchart of a method 100 in accordance with one novel aspect. At block 101, an electric vehicle is connected to an EVSE. For example, in FIG. 2, electric vehicle 11 is connected to the EVSE 12 by connecting the plug 36 of the EVSE 12 to the socket 23 of the electric vehicle 11.

At block 102, a determination is made as to whether a battery of the electric vehicle is able to energize the high voltage DC (HVDC) buses of the electric vehicle. If at block 102 it is determined that the battery of the electric vehicle is able to energize the HVDC buses of the electric vehicle, then the method 100 proceeds to block 103. If, on the other hand, at block 102 it is determined that the battery of the electric vehicle is not able to energize the HVDC buses of the electric vehicle, then the method 100 proceeds to block 106. For example, the controller 18 receives battery information from the BMS 24 of the battery pack 15 and determines whether or not the battery pack 15 is properly balanced, free of faults and failures and at a temperature at which it can energize the HVDC buses 21 and 22.

Figure 5:
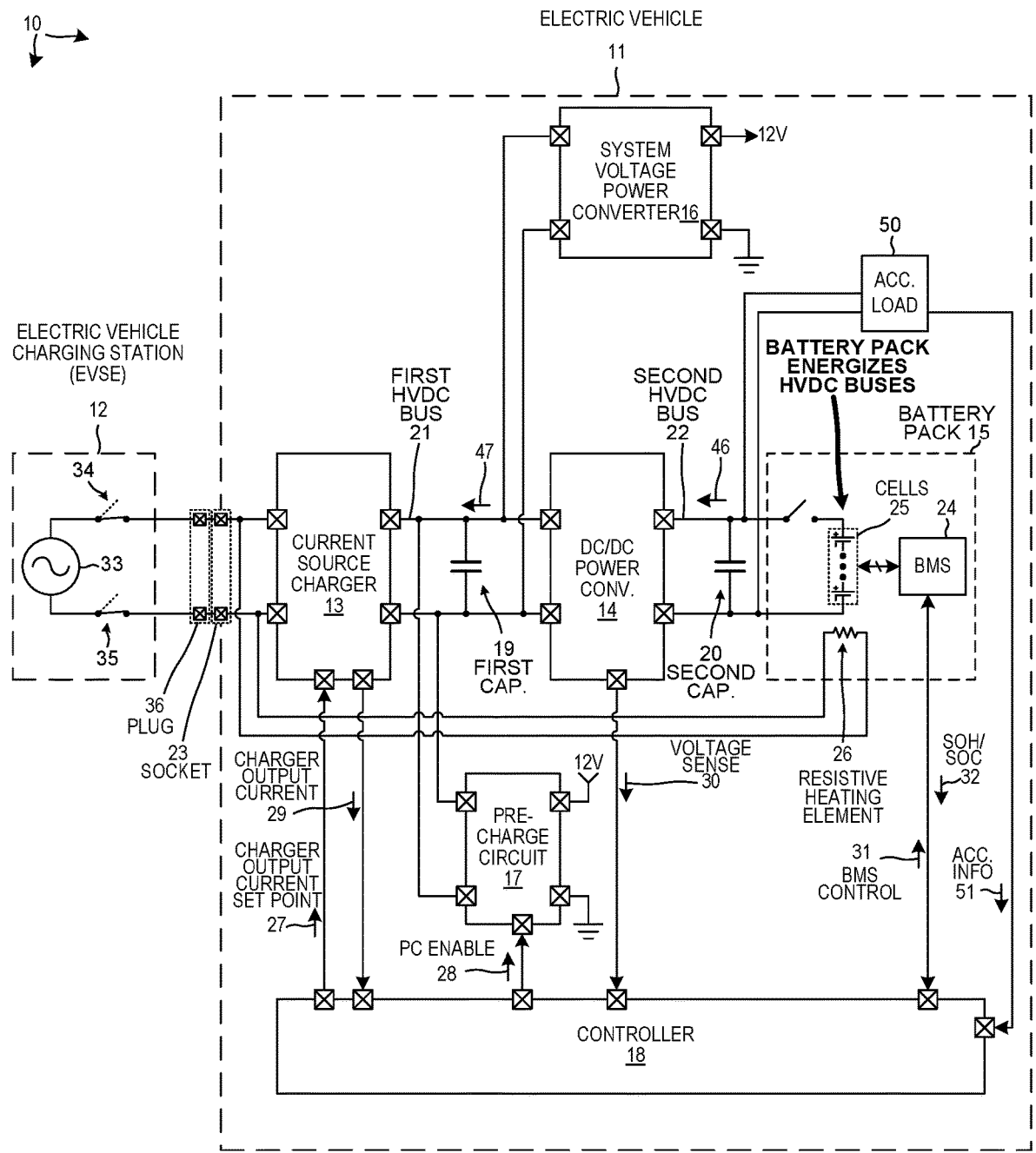
FIG. 5 is a diagram showing a condition when a battery pack 15 is able to energize power buses after plugging into the EVSE 12.

At block 103, the battery of the electric vehicle is connected and energizes the HVDC buses. For example, as shown in FIG. 5, the battery pack 15 is controlled to supply charge onto the second capacitor 20 thereby energizing the second HVDC bus 22. The DC-to-DC power converter 14 receives charge from the second HVDC bus 22, and the DC-to-DC power converter 14 generates and supplies charge 47 onto the first capacitor 19 thereby energizing the HVDC bus 21.

At block 104, a determination is made as to whether the voltage across the first HVDC bus is greater than or equal to an HVDC bus nominal voltage setpoint. If at block 104 it is determined that the voltage across the first HVDC bus 21 is greater than or equal to the HVDC bus nominal voltage setpoint, then the current source charger 13 of the electric vehicle is enabled at block 105 and the battery is charged at block 112. On the other hand, if at block 104 it is determined that the voltage across the first HVDC bus 21 is not greater than or equal to the HVDC bus nominal voltage setpoint, then energizing of the HVDC buses is continued until the voltage across the first HVDC bus 21 reaches the HVDC bus nominal voltage setpoint. For example, in FIG. 5, the DC-to-DC power converter 14 supplies charge onto the first capacitor 19 and first HVDC bus 21 until the voltage across the first HVDC bus 21 reaches the HVDC bus nominal voltage setpoint. Once the voltage across the first HVDC bus 21 reaches the HVDC bus nominal voltage setpoint, then the current source charger 13 is enabled and the EVSE 12 supplies charge to the battery pack 15.

Figure 6:
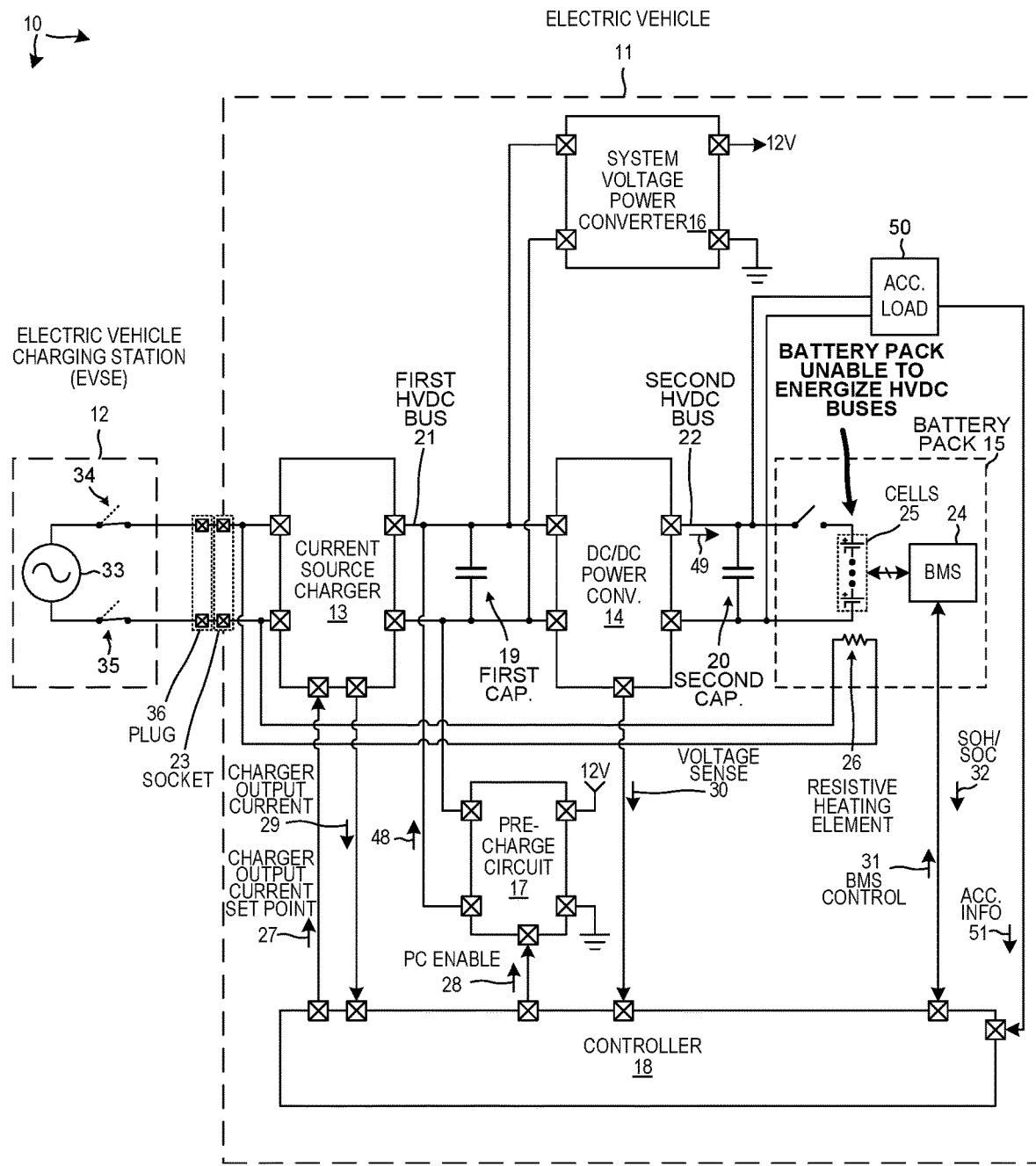
FIG. 6 is a diagram showing a condition when the battery pack 15 is unable to energize power buses after plugging into the EVSE 12.

At block 106, a precharge mode is enabled when it is determined that the battery is unable to energize the HVDC buses at block 102. In the precharge mode, charge is supplied onto the first HVDC bus 21 of the electric vehicle. However, the charge is not sourced from the battery pack 15. For example, as shown in FIG. 6, the precharge circuit 17 is controlled by controller 18 via the PC enable signal 28 to pump charge 48 onto the first HVDC bus 21 and into the first capacitor 19.

At block 107, a determination is made as to whether the voltage across the second HVDC bus 22 is greater than or equal to its peak allowable voltage. Alternatively, a determination is made as to whether the voltage across the first HVDC bus 21 is greater than or equal to the precharge voltage setpoint. If at block 107 it is determined that the voltage across the HVDC bus 21 or 22 is greater than or equal to the relevant setpoint, then the current source charger 13 of the electric vehicle is enabled at block 108. On the other hand, if at block 107 it is determined that the voltage across the HVDC bus 21 or 22 is not greater than or equal to the relevant setpoint, then energizing of the HVDC buses is continued until the voltage across the HVDC bus 21 reaches the relevant setpoint. For example, in FIG. 6, the precharge circuit 17 pumps charge onto the first capacitor 19 until the voltage across the first HVDC bus 21 reaches a precharge voltage setpoint, which is higher than the HVDC bus nominal voltage setpoint. Once the voltage across the first HVDC bus 21 exceeds the HVDC bus nominal voltage setpoint but before it reaches the precharge voltage setpoint, the DC-to-DC converter 14 will begin to move charge which was output from the precharge circuit 17 on the first HVDC bus 21 to the second HVDC bus 22 so as to attempt to keep the voltage across first HVDC bus 21 at the HVDC bus nominal voltage setpoint. The result of the operation of the DC-to-DC power converter 17 will be to increase the voltage of the second HVDC bus 22 until the second HVDC bus 22 reaches its peak allowable voltage. When the second HVDC bus 22 reaches its maximum allowable voltage, then the DC-to-DC converter 14 will no longer move power and the precharge circuit 17 will finish charging the first HVDC bus 21 to the precharge voltage setpoint. Once the voltage across the second HVDC bus 22 reaches its maximum allowable voltage or the voltage across the first HVDC bus 21 reaches the precharge voltage setpoint, then the current source charger 13 is enabled.

At block 108, the current source charger 13 of the electric vehicle is enabled. The current source charger 13 may draw current from its output as it is turning on which may cause the voltage across the HVDC bus 21 to drop as any capacitors connected across an HVDC bus discharge. The drop in the HVDC bus 21 may cause a DC-to-DC converter 14 to move power from one HVDC bus to the other, which allows charge stored on both HVDC buses to be drawn from by the current source charger 13 as it turns on. The precharge circuit 17 may also provide charge to the current source charger 13 as it turns on. Next, at block 109, the charger 13 has been turned on and precharge mode is disabled.

At block 110, the electric loads of the vehicle are powered from the charger 13. For example, the vehicle cabin heater or air conditioning, battery heater or cooler, vehicle hydraulic system and other vehicle accessory loads 50 and system voltage power converter 16 are powered from the charger 13.

At block 111, a determination is made as to whether the battery of the electric vehicle is able to accept charge. If at block 111 it is determined that the battery of the electric vehicle is able to accept charge, then the battery is charged at block 112. On the other hand, if at block 111 it is determined that the battery of the electric vehicle is not able to accept charge, then the current source charger 13 remains enabled and provides power to the HVDC bus 21, which may be used to power vehicle accessories, including battery and vehicle heating and cooling. The controller 18 may balance the current consumed by the vehicle accessories against the power output by the current source charger 13 and use the capacitors across the HVDC buses to compensate for transient imbalances. The precharge mode remains disabled. For example, in FIG. 6, controller 18 enables the current source charger 13 via the COCS signal 27 and then controls the current output of the current source charger 13 via the charger output current signal 29 to match the current source charger 13 output to vehicle accessory loads and disables the precharge circuit 17 via the control PC enable signal 28. The controller 18 receives battery information from the BMS 24 of the battery pack 15 and determines whether or not the battery pack 15 is able to charge.

Next, at block 113, a determination is made as to whether battery charging is complete. If at block 113 it is determined that the battery charging is complete, then an idle mode is enabled at block 114. On the other hand, if at block 113 it is determined that the battery charging is not complete, then the charging continues at block 112 until charging is complete. For example, the controller 18 receives battery information from the BMS 24 of the battery pack 15 and determines whether or not the battery pack 15 has completed charging.

Figure 7:
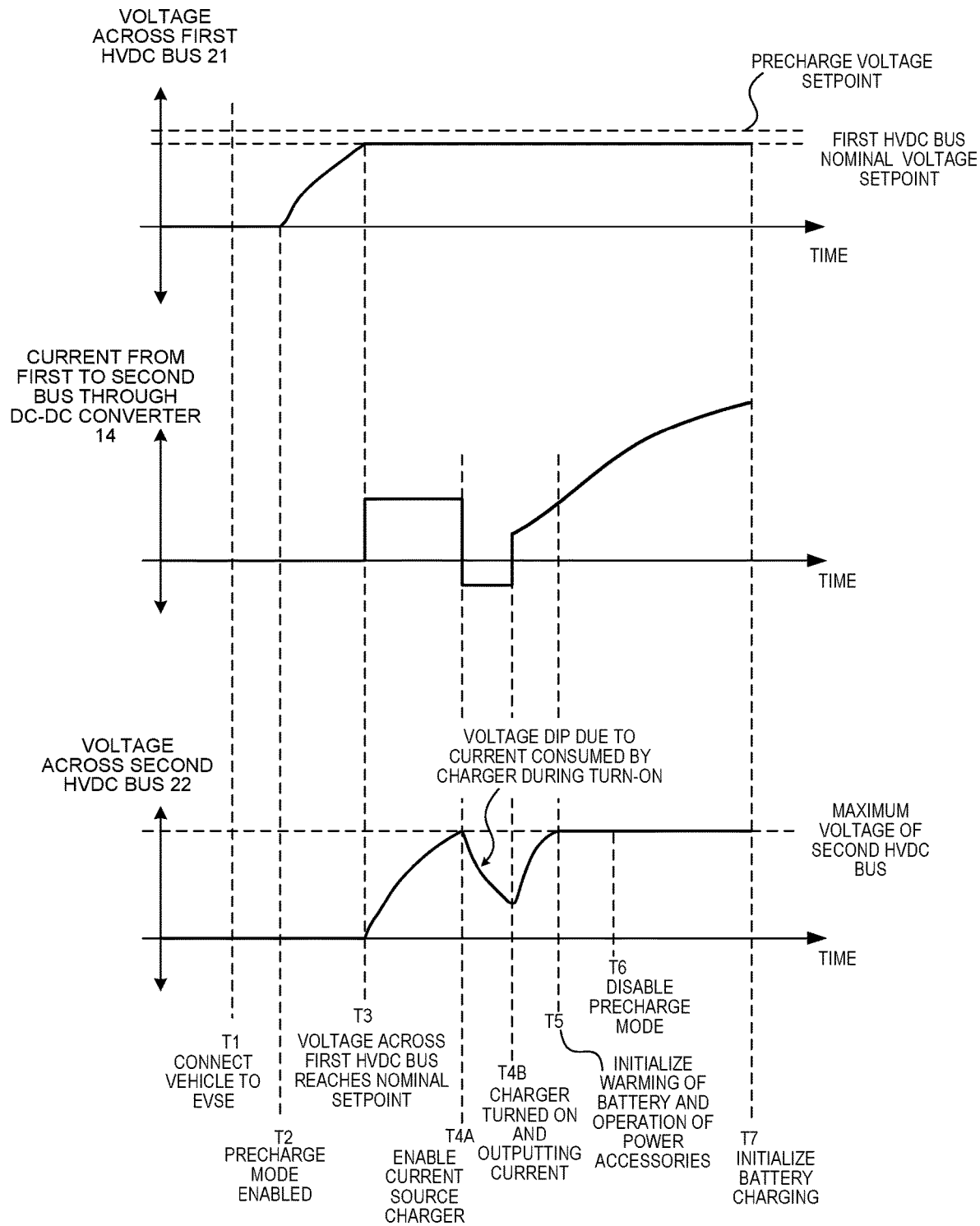
FIG. 7 is a waveform diagram showing voltage levels of two high voltage DC buses at various times during operation that involves the precharge mode.

FIG. 7 is a waveform diagram showing voltage levels of the first HVDC bus 21 and the second HVDC bus 22 at various times during operation that involves the precharge mode.

At time T1, the electric vehicle is connected to the EVSE.

At time T2, a precharge mode is enabled. This causes the voltage across the first HVDC bus 21 to increase.

At time T3, the voltage across the first HVDC bus 21 reaches the first HVDC bus nominal voltage setpoint and the second HVDC bus 22 voltage begins to increase.

At time T4A, the current source charger 13 is enabled and it draws current from its output which in turn causes the DC-to-DC converter 14 to move current from the second 22 to the first 21 HVDC bus to regulate the voltage of the first HVDC bus 21.

At time T4B, the current source charger 13 is turned on and begins outputting current.

At time T5, the current source charger 13 is fully turned on and outputting current so that the battery 15 may be warmed and other vehicle accessory loads 50 are powered from the charger.

At time T6, the precharge mode is disabled.

At time T7, battery charging is initialized.

Figure 8:
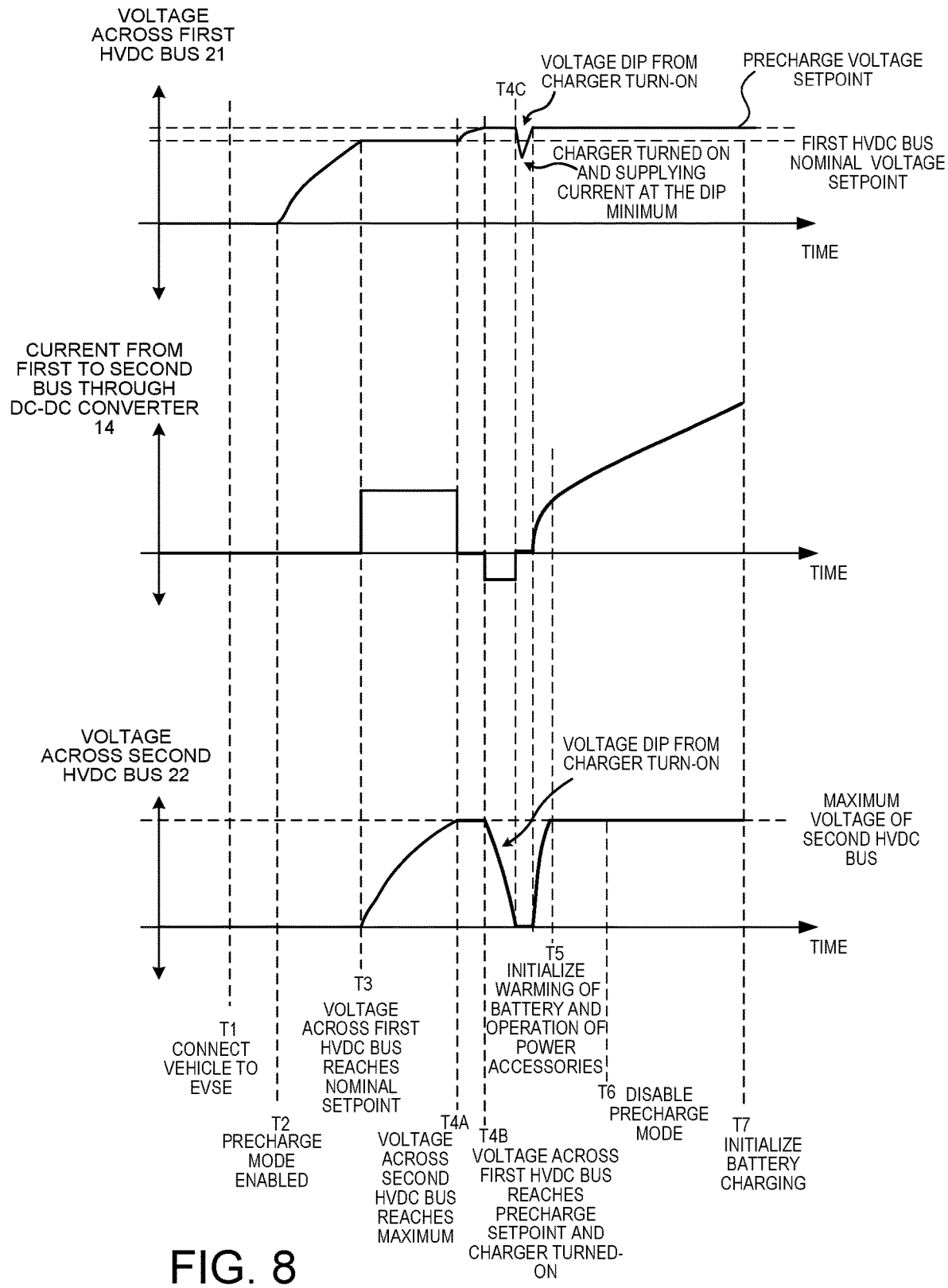
FIG. 8 is an alternate waveform diagram showing voltage levels of two high voltage DC buses at various times during operation that involves the precharge mode.

FIG. 8 is an alternate waveform diagram showing voltage levels of the first HVDC bus 21 and the second HVDC bus 22 at various times during operation that involves the precharge mode. The events at times T1, T2, and T3 are the same as in FIG. 7.

At time T4A, the voltage across the second HVDC bus 22 reaches a maximum and the DC-to-DC converter discontinues current flow from the first HVDC Bus 21 to the second HVDC bus 22.

At time T4B, the voltage across the first HVDC bus reaches the precharge setpoint and the charger 13 is enabled. The charger 13 draws current from its output which in turn causes the DC-to-DC converter 14 to move current from the second 22 to the first 21 HVDC bus to regulate the voltage of the first HVDC bus 21.

At time T4C, the voltage across the first HVDC bus dips from the charger 13 turn-on. The dip shows that energy from both buses is being used during charger turn-on.

The events at times T5, T6, and T7 are the same as in FIG. 7.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A method comprising:
 detecting when a battery of an electric vehicle is unable to accept charge;
 enabling a precharge mode in response to detecting that the battery is unable to accept charge; and
 enabling a charger, wherein an output voltage of the charger changes based on a controlled current output by the charger, and wherein the charger is enabled after detecting that a voltage across a voltage bus is at a setpoint voltage and before the battery is able to accept charge.

2. The method of claim 1, wherein the charger supplies a load on the electric vehicle before the battery is able to accept charge.

3. The method of claim 2, further comprising:
 using a power converter to move energy between the voltage bus and a second voltage bus on the electric vehicle as an output from the charger is being enabled.

4. The method of claim 2, further comprising:
 charging the battery of the electric vehicle using the charger after detecting that the battery is able to accept charge.

5. The method of claim 2, wherein the load is a vehicle subsystem, and wherein the vehicle subsystem is an air conditioning system, a heating system, or a hydraulics system.

6. The method of claim 1, wherein the electric vehicle is connected to an electric vehicle charging station (EVSE).

7. The method of claim 1, wherein the voltage bus is a high voltage bus, and wherein the high voltage bus is coupled between one side of a bi-directional power converter, an output of the charger and an output of a precharge circuit.

8. The method of claim 1, wherein during the precharge mode, charge is supplied onto the voltage bus.

9. The method of claim 8, wherein the charge supplied onto the voltage bus is supplied from an output of a precharge circuit.

10. The method of claim 9, wherein the precharge circuit output is coupled to an output of the charger and one side of a DC-to-DC power converter, and wherein the DC-to-DC power converter is connected to the battery.

11. The method of claim 10, wherein the DC-to-DC power converter is coupled to a vehicle accessory power load.

12. An electric vehicle comprising:
 a battery pack, wherein the battery pack is connected to a high voltage bus of the electric vehicle;
 a controller, wherein the controller enables a precharge mode in response to detecting that the battery pack is unable to accept charge; and
 a charger, wherein an output voltage of the charger changes based on a controlled current output by the charger, and wherein the charger is enabled in the precharge mode after detecting that a voltage across the high voltage bus is at a setpoint voltage and before the battery is able to accept charge.

13. The electric vehicle of claim 12, further comprising:
 a capacitor coupled across a high voltage bus; and
 a precharge circuit, wherein when the controller enables the precharge mode, the precharge circuit supplies charge onto the high voltage bus.

14. The electric vehicle of claim 12, further comprising:
 a bi-directional DC-to-DC power converter, wherein the bidirectional DC-to-DC power converter is coupled between the high voltage bus and a second high voltage bus, each having a capacitor across them, and wherein the DC-to-DC power converter is controllably coupled to the controller.

15. The electric vehicle of claim 14, wherein the DC-to-DC power converter is configured to control current flow to regulate a voltage of the high voltage bus.

16. The electric vehicle of claim 12, wherein the charger is controllably coupled to the controller, and wherein the controller controls the charger to supply current to the high voltage bus before the battery is able to accept charge.

17. The electric vehicle of claim 16, wherein the battery of the electric vehicle is charged using the charger after detecting that the battery is able to accept charge.

18. An electric vehicle comprising:
 a battery pack, wherein the battery pack is connected to a high voltage bus of the electric vehicle;
 a controller, wherein the controller enables a precharge mode in response to detecting that the battery pack is unable to accept charge; and
 a current source charger, wherein the current source charger is enabled in the precharge mode after detecting that a voltage across the high voltage bus is at a setpoint voltage and before the battery is able to accept charge, and wherein the controller detects that the battery is unable to energize the high voltage bus after the electric vehicle is connected to an electric vehicle charging station (EVSE).

19. An electric vehicle comprising:
 a battery pack, wherein the battery pack is connected to a high voltage bus of the electric vehicle;
 a controller, wherein the controller enables a precharge mode in response to detecting that the battery pack is unable to energize the high voltage bus; and
 a bi-directional power converter, wherein after the controller enables the precharge mode, the bi-directional power converter moves charge from a precharge circuit output to a capacitor and later moves charge to be across output terminals of a current mode charger as that charger's output is enabled.

20. A non-transitory computer readable storage medium comprising stored instructions thereon, the instructions when executed causes a processor to:
 detect that a battery of an electric vehicle is unable to accept charge; and
 enable a charger, wherein an output voltage of the charger changes based on a controlled current output by the charger, and wherein the charger is enabled after detecting that a voltage across a voltage bus of the electric vehicle is at a setpoint voltage and before the battery is able to accept charge.

* * * * *